(12) United States Patent
Kuzuyama (10) Patent No.: US 8,522,730 B2
(45) Date of Patent: Sep. 3, 2013

(54) HOMOGENOUS CHARGE COMPRESSION IGNITION ENGINE AND CONTROLLING METHOD OF THE ENGINE

(75) Inventor: Hiroshi Kuzuyama, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 887 days.

(21) Appl. No.: 12/287,953

(22) Filed: Oct. 14, 2008

(65) Prior Publication Data

US 2009/0095250 A1  Apr. 16, 2009

(30) Foreign Application Priority Data

Oct. 15, 2007  (JP) ................. 2007-267498

(51) Int. Cl.
*F02B 1/12* (2006.01)
(52) U.S. Cl.
USPC ........ 123/27 R; 123/295; 123/305; 123/90.15
(58) Field of Classification Search
USPC .............. 123/27 R, 295, 90.15, 305
See application file for complete search history.

(56) References Cited

U.S. PATENT DOCUMENTS

| | | | |
|---|---|---|---|
| 6,336,436 B1 * | 1/2002 | Miyakubo et al. | 123/295 |
| 6,636,797 B2 | 10/2003 | Yoshizawa et al. | |
| 6,644,019 B2 | 11/2003 | Morikawa et al. | |
| 6,978,771 B2 * | 12/2005 | Kuzuyama et al. | 123/568.11 |
| 7,089,913 B2 * | 8/2006 | Yamaoka et al. | 123/406.48 |
| 7,367,310 B2 | 5/2008 | Kakuya et al. | |
| 7,370,616 B2 * | 5/2008 | Kuo et al. | 123/90.15 |
| 7,874,280 B2 * | 1/2011 | Kuzuyama | 123/430 |
| 2004/0134449 A1 * | 7/2004 | Yang | 123/27 R |
| 2006/0196466 A1 * | 9/2006 | Kuo et al. | 123/295 |
| 2007/0215095 A1 * | 9/2007 | Kakuya et al. | 123/295 |
| 2008/0066713 A1 * | 3/2008 | Megli et al. | 123/295 |

FOREIGN PATENT DOCUMENTS

| | | |
|---|---|---|
| JP | 05-106411 A | 4/1993 |
| JP | 10-018826 A | 1/1998 |
| JP | 10-252575 A | 9/1998 |
| JP | 2002-004913 A | 1/2002 |
| JP | 2002-089305 A | 3/2002 |
| JP | 2002-188464 A | 7/2002 |
| JP | 2002-256872 A | 9/2002 |
| JP | 2003-106184 | 4/2003 |
| JP | 2007-16685 | 1/2007 |
| JP | 2007-077919 | 3/2007 |
| JP | 2007-100526 A | 4/2007 |
| JP | 2007-247479 A | 9/2007 |

* cited by examiner

*Primary Examiner* — Marguerite McMahon
*Assistant Examiner* — James Kim
(74) *Attorney, Agent, or Firm* — Locke Lord LLP (57) ABSTRACT

A controller sets a negative valve overlap period, during which both of an intake valve and an exhaust valve are closed, such that not all the burned gas is discharged from the combustion chamber. When switching the combustion mode from the spark ignition combustion to the HCCI combustion, the controller executes following operations a), b), and c):
  a): switching the intake lift amount from a first intake lift amount to a second intake lift amount, such that intake opening timing is delayed relative to an exhaust top dead center;
  b): switching the exhaust lift amount from a first exhaust lift amount to a second exhaust lift amount after the operation a); and
  c) delaying the exhaust closing timing relative to a reference exhaust closing timing, such that the internal EGR amount is generated.

7 Claims, 7 Drawing Sheets

HOMOGENOUS CHARGE COMPRESSION IGNITION ENGINE AND CONTROLLING METHOD OF THE ENGINE

BACKGROUND OF THE INVENTION

The present invention relates to a homogenous charge compression ignition engine (HCCI engine). In the HCCI engine of the present invention, the combustion mode can be switched between homogenous charge compression ignition combustion (HCCI combustion) and spark ignition combustion (SI combustion).

In recent years, homogenous charge compression ignition (HCCI) engines have been drawing attention, and various researches have been conducted on such engines. Excellent fuel economy and thermal efficiency and low emission can be gained from the HCCI engines. In some kinds of HCCI engines, fuel is directly injected into a combustion chamber during an intake stroke. That is, only air is drawn into the combustion chamber from an intake passage and fuel is mixed with air for the first time in the combustion chamber. However, in most of the HCCI engines, the fuel is mixed with air on the intake passage so as to generate air-fuel mixture. The air-fuel mixture is supplied to the combustion chamber from the intake passage.

The temperature increases and the pressure rises in the air-fuel mixture contained inside the combustion chamber as a piston rises at the time of the compression stroke of the engine, so that the mixture spontaneously ignites. One obstacle that needs to be overcome in terms of putting HCCI engines into practice is that the engine operating range, which allows homogenous charge compression ignition (HCCI) combustion to be stably controlled, is still narrow. In order to overcome the obstacle, there is a trend to implement HCCI combustion in stationary engines where the ordinarily used operating range is relatively narrow, for example, gas engines for GHPs (gas heat pumps).

In an actual operation of the HCCI engines, an engine low rotation speed range, a middle rotation speed range, a low load range and a middle load range are frequently used. It has been proposed that the combustion mode is switched between the HCCI combustion range and the spark ignition (SI) combustion range according to the running state of the engine. The spark ignition (SI) combustion is carried out in the high rotation speed range, the extremely low load range, and the high load range.

Japanese Laid-Open Patent Publication No. 2007-16685 discloses a controlling method in which, which switching from the spark ignition combustion to the HCCI combustion, the internal EGR amount is increased at the same time as making the air-fuel ratio leaner. When switching from the spark ignition combustion to the HCCI combustion, the intake air amount to the engine is increased when the combustion mode is still in the spark ignition combustion, thereby making the air-fuel ratio leaner. At the same time as making the air-fuel ratio leaner, the internal EGR amount is increased. Thereafter, the spark ignition combustion is switched to the HCCI combustion via the stratified combustion.

According to the controlling method of the above publication, the internal EGR gas is caused when the combustion mode is still in the spark ignition combustion, that is, when the HCCI combustion is still difficult to carry out. Since the internal EGR gas has a high temperature, the spark ignition combustion and the HCCI combustion might be simultaneously carried out. This can lead to a significant torque fluctuation.

Further, in the controlling method of the publication, the stratified charge combustion is temporarily performed when switching from the spark ignition combustion to the HCCI combustion. The stratified charge combustion is effective in increasing the throttle opening degree in a state where the air-fuel ratio has been made leaner to improve the ignitability of the spark ignition combustion. However, the stratified charge combustion requires an "in-cylinder injector", which directly injects fuel into the combustion chamber. That is, an in-cylinder direct injection system is necessary that includes an in-cylinder injector, which injects fuel at high pressure. The above publication thus has drawbacks in terms of the manufacturing costs and power loss. Further, the transitional execution of the stratified charge combustion eliminates some of the advantages of the HCCI combustion, namely the improvement of the fuel economy and the reduction in emission.

An objective of the present invention is to suppress the occurrence of abrupt changes in the torque of the HCCI engine when the combustion mode is switched from the spark ignition combustion to the HCCI combustion.

In accordance with one aspect of the present invention, a homogenous charge compression ignition engine (HCCI) is provided. The HCCI engine is capable of switching the combustion mode between the HCCI combustion and the spark ignition combustion. The HCCI engine includes a combustion chamber and a piston that reciprocates in the combustion chamber. The piston defines an exhaust top dead center of the combustion chamber. The HCCI engine includes an intake valve and an exhaust valve. An intake variable valve mechanism changes an intake lift amount, which is a lift amount of the intake valve. The intake lift amount is set to a first intake lift amount in the spark ignition combustion and to a second intake lift amount in the HCCI combustion. The intake variable valve mechanism is capable of controlling an intake opening timing, which is the opening timing of the intake valve. An exhaust variable valve mechanism changes an exhaust lift amount, which is a lift amount of the exhaust valve. The exhaust lift amount is set to a first exhaust lift amount in the spark ignition combustion and to a second exhaust lift amount in the HCCI combustion. The exhaust variable valve mechanism is capable of controlling an exhaust closing timing, which is the closing timing of the exhaust valve. A reference exhaust closing timing to be used in the HCCI combustion is set. A controller controls the intake variable valve mechanism and the exhaust variable valve mechanism. The controller sets an internal EGR amount, which includes the amount of burned gas that remains in the combustion chamber at the time of the HCCI combustion, by setting a negative valve overlap period, during which both of the intake valve and the exhaust valve are closed, such that not all the burned gas is discharged from the combustion chamber. When switching the combustion mode from the spark ignition combustion to the HCCI combustion, the controller executes following operations a), b), and c):

a): switching the intake lift amount from the first intake lift amount to the second intake lift amount, such that the intake opening timing is delayed relative to the exhaust top dead center;

b): switching the exhaust lift amount from a first exhaust lift amount to a second exhaust lift amount after the operation a); and c) delaying the exhaust closing timing relative to the reference exhaust closing timing, such that the internal EGR amount is generated.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENT

Figure 1:
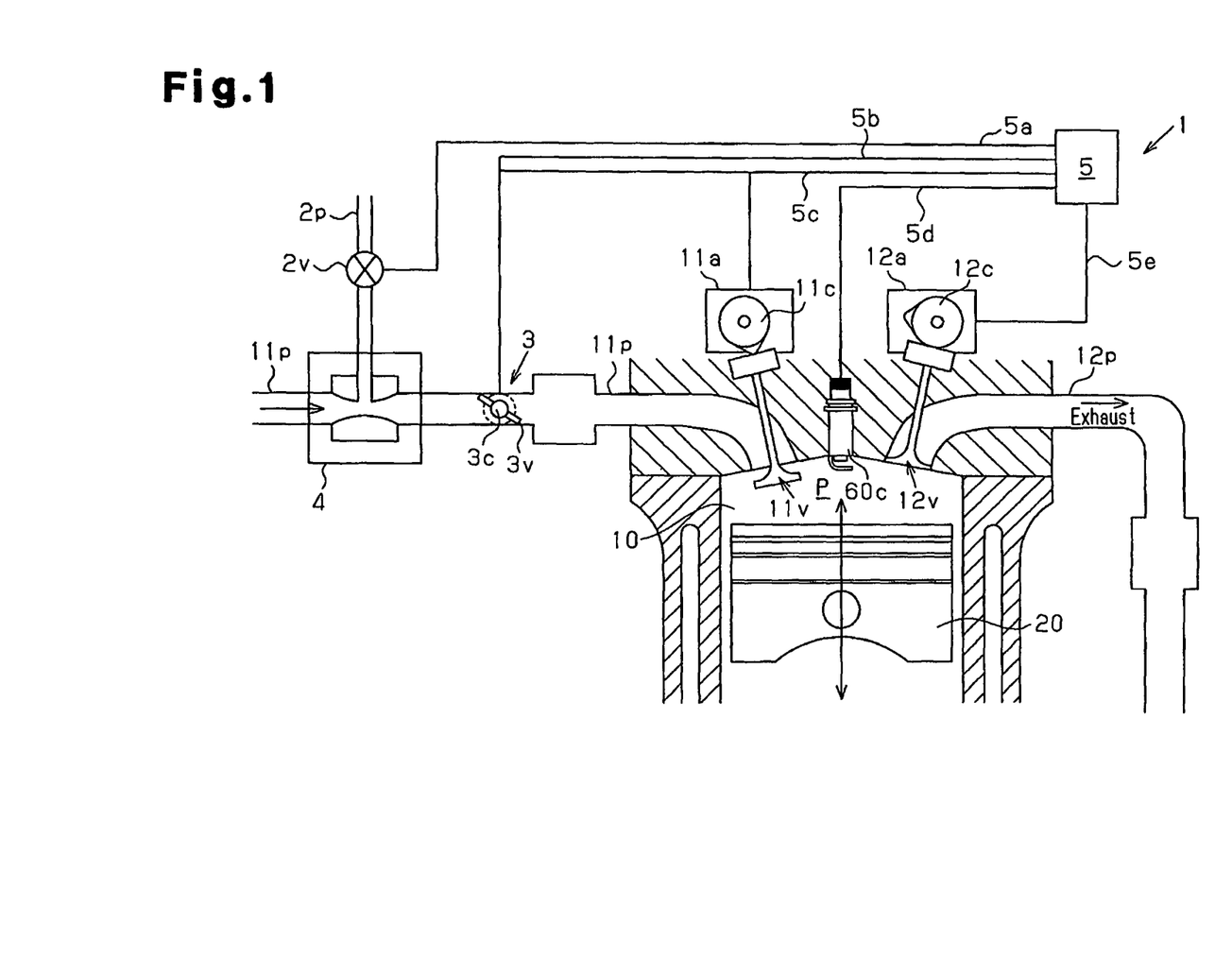
FIG. 1 is a block diagram of an HCCI engine according to one embodiment of the present invention.

FIGS. 1 to 7 show one embodiment of the present invention. FIG. 1 shows an HCCI engine 1 according to one embodiment.

As shown in FIG. 1, the HCCI engine 1 has a combustion chamber 10, an intake passage 11p, an intake valve 11v, an exhaust valve 12v, an exhaust passage 12p, and a piston 20. The intake passage 11p is connected to the combustion chamber 10. The operating state of the HCCI engine 1 is switched between HCCI combustion and spark ignition combustion according to the operating condition such as an engine load and the number of rotation of the engine. An ECU (electronic control unit) 5 is a controller that switches the operating state of the HCCI engine 1. As a result, the combustion mode is switched between the HCCI combustion, which reduces fuel consumption, and the spark ignition combustion, which increases output power, as is necessary.

A mixing portion 4 is provided on the intake passage 11p. Fuel is supplied from a fuel tank (not shown) to the mixing portion 4 through a fuel supplying path 2p so that air and the fuel are mixed in the mixing portion 4. Gasoline or a gas fuel such as city gas or LPG may be used as the fuel. The mixing portion 4 is a carburetor. If the gas is used as the fuel, the mixing portion 4 may be a mixer.

A throttle 3 is provided on the intake passage 11p between the mixing portion 4 and the combustion chamber 10. A fuel valve 2v is provided on the fuel supplying path 2p. The fuel valve 2v functions as a fuel supplying device. The ECU 5 controls operations of the fuel valve 2v, the throttle 3, the intake valve 11v, an ignition plug 60c, and the exhaust valve 12v. The ignition plug 60c is an igniting portion that is used at the time of the spark ignition combustion. The ignition plug 60c may be used when the combustion mode is switched from the HCCI combustion to the spark ignition combustion to stabilize the combustion. The ECU 5 controls the fuel valve 2v, the throttle 3, the intake valve 11v, the ignition plug 60c and the exhaust valve 12v through control cables 5a to 5e, respectively.

The ECU 5 controls an opening degree of the fuel valve 2v so as to control the fuel supplying amount F to the intake passage 11p.

The throttle 3 has a shaft 3c, a vane 3v, and a step motor (not shown). The vane 3v is rotated around the shaft 3c. The ECU 5 controls the step motor to control the opening degree of the vane 3v, that is, the throttle opening degree TA. As a result, the intake supply amount to the combustion chamber 10 from the intake passage 11p is controlled. In the present embodiment, the intake air to the combustion chamber 10 refers to air-fuel mixture generated in the mixing portion 4.

The ECU 5 controls an intake variable valve mechanism 11a and an exhaust variable valve mechanism 12a. The intake variable valve mechanism 11a and the exhaust variable valve mechanism 12a are variable valve mechanisms that change valve characteristics such as the lift amount and the valve open/close timing of the intake valve 11v and the exhaust valve 12v according to the operating conditions of the HCCI engine 1.

The intake variable valve mechanism 11a controls the lift amount and the open/close timing of the intake valve 11v via the intake cam 11c. In this embodiment, the lift amount of the intake valve 11v represents an intake valve characteristics. A maximum intake lift amount IL represents the lift amount of the intake valve 11v. An intake opening timing ITopn represents the opening timing of the intake valve 11v. The intake opening timing ITopn for executing the HCCI combustion is referred to as a reference intake opening timing ITopn0. That is, the reference intake opening timing ITopn0 represents an intake opening timing ITopn that corresponds to the engine load and the engine speed in the HCCI combustion.

The exhaust variable valve mechanism 12a controls the lift amount and the open/close timing of the exhaust valve 12v via the exhaust cam 12c. In this embodiment, the lift amount of the exhaust valve 12v represents an exhaust valve characteristics. A maximum exhaust lift amount EL represents the maximum lift amount of the exhaust valve 12v. An exhaust closing timing ETcls represents the closing timing of the exhaust valve 12v.

The exhaust closing timing ETcls for executing the HCCI combustion is referred to as a reference exhaust closing timing ETcls0. That is, the reference exhaust closing timing ETcls0 represents an exhaust closing timing ETcls that corresponds to the engine load and the engine speed in the HCCI combustion.

As disclosed in Japanese Laid-Open Patent Publication Nos. 5-106411 and 10-18826, the intake cam 11c is switched between an intake low lift cam and an intake high lift cam. The ECU 5 uses the intake high lift cam when setting the first intake lift amount IL1 and uses the intake low lift cam when setting the second intake lift amount IL2. The maximum intake lift amount is set to the first intake lift amount IL1 in the spark ignition combustion, and is set to the second intake lift amount IL2 in the HCCI combustion. The first intake lift amount IL1 is greater than the second intake lift amount IL2. The ECU 5 switches the intake cam 11c between the intake low lift cam and the intake high lift cam according to the operating conditions of the HCCI engine 1. As a result, the intake lift amount IL is changed.

Similarly, the exhaust cam 12c is switched between an exhaust low lift cam and an exhaust high lift cam. The ECU 5 uses the exhaust high lift cam when setting the first exhaust lift amount EL1 and uses the exhaust low lift cam when setting the second exhaust lift amount EL2. The exhaust lift amount is set to the first exhaust lift amount EL1 in the spark ignition combustion, and is set to the second exhaust lift amount EL2 in the HCCI combustion. The first exhaust lift amount EL1 is grater than the second exhaust lift amount EL2.

The intake cam 11c is provided on an intake camshaft (not shown). Power generated in the combustion chamber 10 is transmitted to the intake camshaft via a crankshaft of the HCCI engine 1 so as to rotate the intake cam 11c. An intake cam gear is provided on an end portion of the intake camshaft (not shown). The intake cam gear transmits a driving force of the crankshaft to the intake camshaft. The ECU 5 controls a phase difference between the intake cam gear and the intake camshaft according to the known method. Similarly, the exhaust cam 12c is provided on the exhaust camshaft (not shown). Power generated in the combustion chamber 10 is also transmitted to the exhaust camshaft so as to rotate the exhaust cam 12c. An exhaust cam gear is provided on an end portion of the exhaust camshaft (not shown). The exhaust cam gear transmits a driving force of the crankshaft to the exhaust camshaft. The ECU 5 controls a phase difference between the exhaust cam gear and the exhaust camshaft according to the known method.

The ECU 5 controls the intake variable valve mechanism 11a and the exhaust variable valve mechanism 12a so as to provide a negative valve overlap period at the time of HCCI combustion. As a result, internal EGR gas is generated and the HCCI combustion is carried out. The negative valve overlap period is a period during which both of the exhaust valve 12v and the intake valve 11v are closed when the piston is located in the vicinity of the exhaust top dead center TDC. The exhaust top dead center TDC is a top dead center when an exhaust stroke of an engine ends. During the HCCI combustion, the ECU 5 sets the exhaust closing timing ETcls to be advanced relative to the exhaust top dead center TDC. Since a part of burned gas remains in the combustion chamber 10, the internal EGR gas is generated. The internal EGR amount Qegr represents the sum of the burned gas that remains in the combustion chamber 10 without being discharged therefrom and the burned gas that has been temporarily discharged from the combustion chamber 10 and then returned to the combustion chamber 10 from the exhaust passage 12p through the exhaust valve 12v when the exhaust valve 12v is subsequently opened. That is, the internal EGR amount Qegr includes the amount of burned gas that remains in the combustion chamber 10 until the next combustion cycle. The internal EGR gas is carried over until the next combustion cycle in the combustion chamber 10. The internal EGR gas having a high temperature is mixed with air-fuel mixture that is newly supplied to the combustion chamber 10. This increases the temperature in the combustion chamber 10. Therefore, the ignitability of the air-fuel mixture at the time of HCCI combustion is improved. The ECU 5 controls a length of the negative valve overlap period so as to control the ignition timing of the HCCI combustion to some extent. The temperature of the combustion chamber 10 represents the in-cylinder temperature of the HCCI engine 1.

Figure 2:
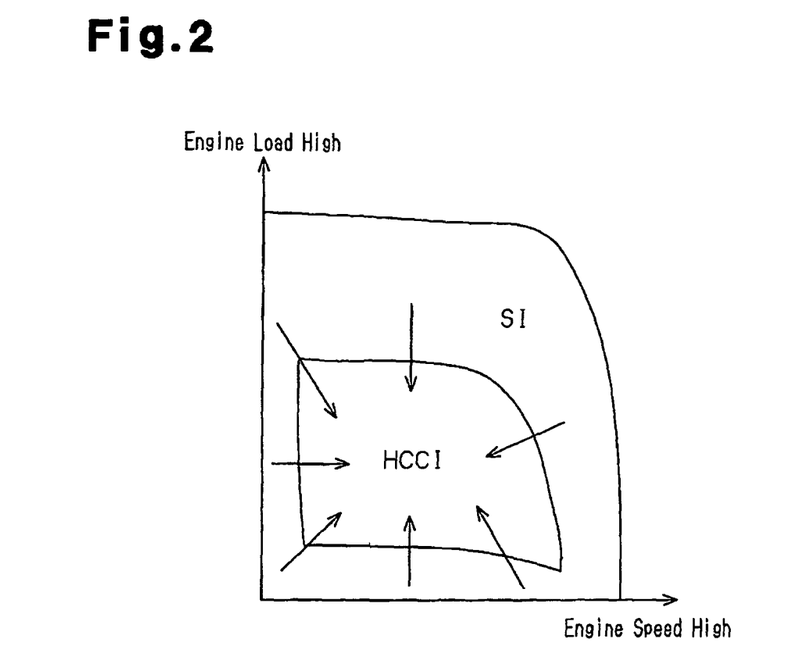
FIG. 2 is a graph showing a relationship between an engine load and an engine speed and showing an operating range of the HCCI engine of FIG. 1 in the HCCI combustion and the spark ignition combustion.

FIG. 2 shows the operating range of each of the HCCI combustion and the spark ignition combustion of the HCCI engine 1. The graph shown in FIG. 2 has a vertical axis representing the engine load and a horizontal axis representing the engine rotational speed. The spark ignition combustion range surrounds the HCCI combustion range. The arrows shown in FIG. 2 represent various switching patterns from the spark ignition combustion to the HCCI combustion. The switching patterns shown in FIGS. 3 to 5B are examples of the various combustion mode switching patterns shown in FIG. 2.

FIGS. 3 to 5B show the switching patterns from the HCCI combustion to the spark ignition combustion according to the present embodiment.

Figure 3:
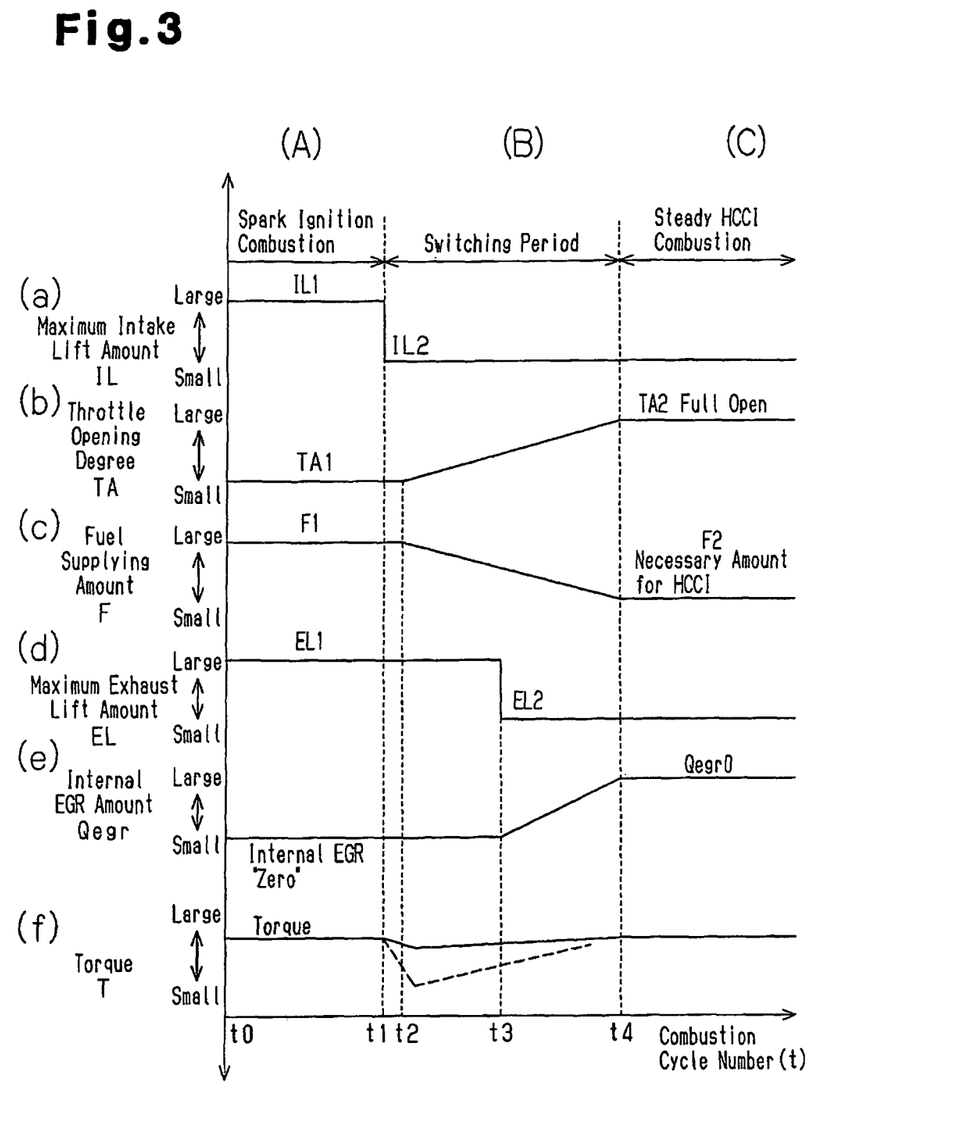
FIG. 3 is a timing chart showing (a) maximum intake lift amount, (b) throttle opening degree, (c) fuel supplying amount, (d) maximum exhaust lift amount, (e) internal EGR gas amount, and (f) torque fluctuation, when the combustion mode of the HCCI engine of FIG. 1 is switched from the spark ignition combustion to the HCCI combustion.

The vertical axis in FIG. 3 shows:
 (a) maximum intake lift amount IL;
 (b) throttle opening degree TA;
 (c) fuel supplying amount F;
 (d) maximum exhaust lift amount EL;
 (e) internal EGR amount Qegr in the combustion chamber 10; and
 (f) torque T of the HCCI engine.

The horizontal axis in FIG. 3 represents the number of combustion cycles. FIG. 3 shows:
 (A) steady operation period of the spark ignition combustion (SI combustion);
 (B) switching period from the spark ignition combustion to the HCCI combustion; and
 (C) steady operation period of the HCCI combustion.

The ECU 5 controls the maximum intake lift amount IL, the throttle opening degree TA, the fuel supplying amount F, and the exhaust lift amount EL, thereby controlling the internal EGR amount Qegr and the torque T.

Figure 4A:
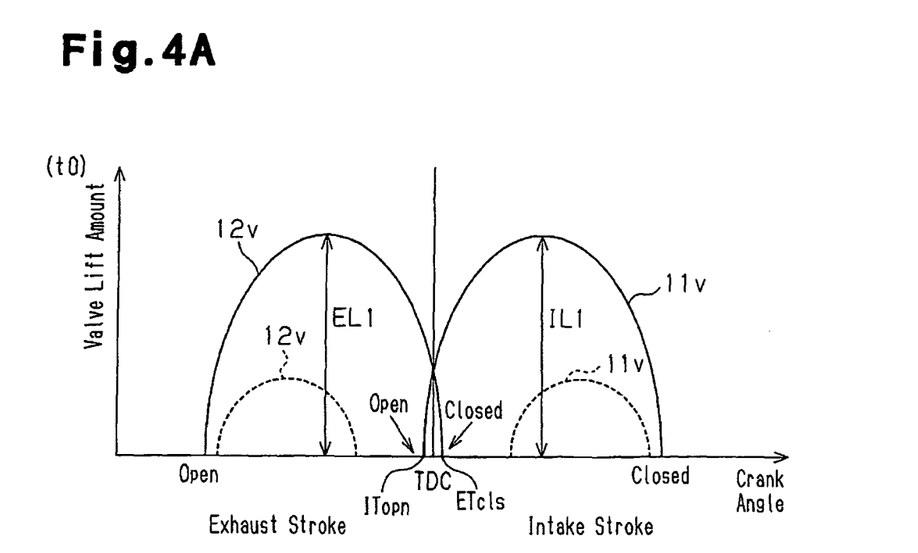
FIG. 4A is a timing chart showing the intake lift amount and the exhaust lift amount in the spark ignition combustion at time point t0 in FIG. 3.
Figure 4B:
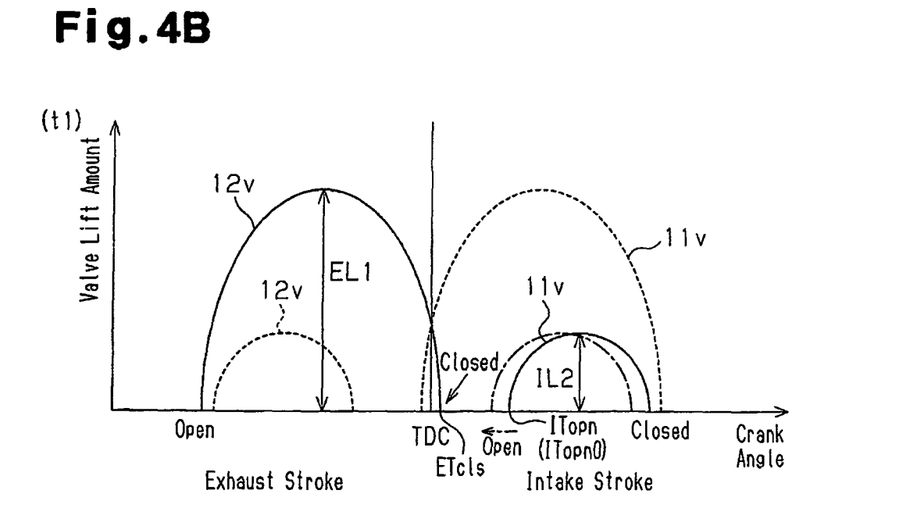
FIG. 4B is a timing chart showing a state where the intake lift amount is decreased from the state shown in FIG. 4A at time point t1.
Figure 5A:
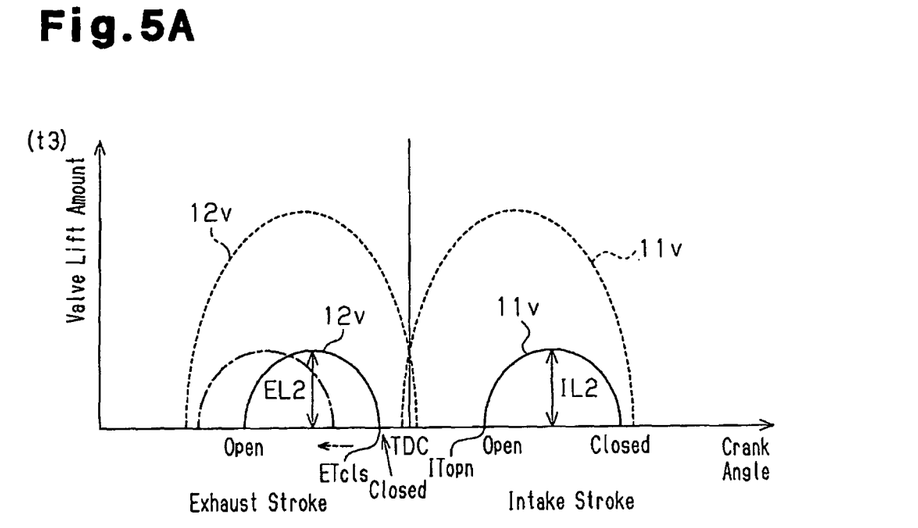
FIG. 5A is a timing chart showing a state where the exhaust lift amount is decreased from the state shown in FIG. 4B at time point t3.
Figure 5B:
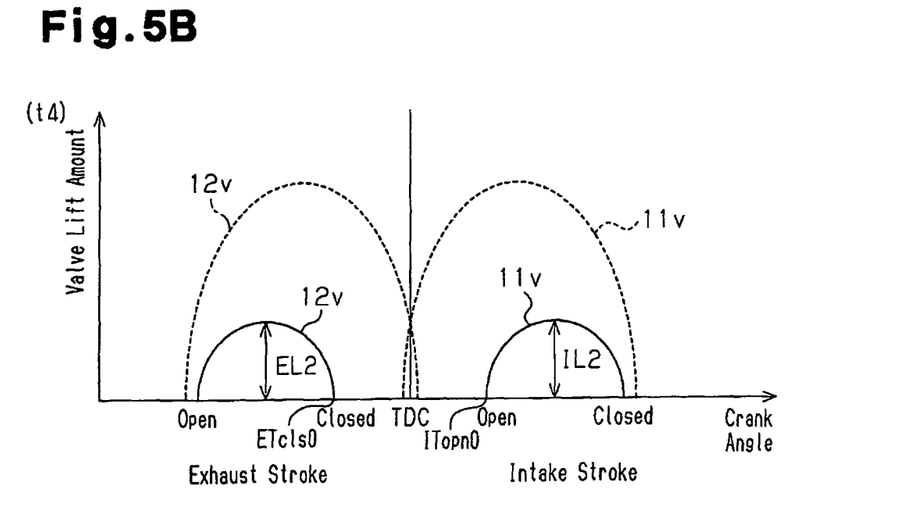
FIG. 5B is a timing chart showing the HCCI combustion at time point t4, in which the exhaust closing timing ETcls has been advanced from the state shown in FIG. 5A.

FIGS. 4A, 4B, 5A, and 5B show the intake lift amount and the exhaust lift amount when the combustion mode is switched from the spark ignition combustion to the HCCI combustion. FIG. 4A shows a first intake lift amount and a first exhaust lift amount at the time of the steady operation of the spark ignition combustion. That is, FIG. 4A shows an intake cam profile of the intake valve 11v and an exhaust cam profile of the exhaust valve 12v at time point t0 in FIG. 3. FIG. 5B shows a second intake lift amount and a second exhaust lift amount at the time of the steady operation of the HCCI combustion. That is, FIG. 5B shows the intake cam profile of the intake valve 11v and the exhaust cam profile of the exhaust valve 12v at time point t4 in FIG. 3. The horizontal axis in FIGS. 4A to 5B shows the crank angle. The vertical axis in FIGS. 4A to 5B shows the intake lift amount and the exhaust lift amount.

As shown in FIG. 3(b), the throttle opening degree TA is set to be the first throttle opening degree TA1 at time point t0 at the time of the spark ignition combustion, and is set to be the second throttle opening degree TA2 at time point t4 at the time of the HCCI combustion. The first throttle opening degree TA1 is smaller than the second throttle opening degree TA2.

In the present embodiment, the second throttle opening degree TA2 is set to be a fully open state of the throttle 3. Pressure difference is caused in the intake passage 11p between the upstream portion and the downstream portion with respect to the throttle 3. The intake negative pressure is caused in the intake passage 11p at the downstream portion with respect to the throttle 3. Atmospheric pressure is in the upstream portion of the intake passage 11p with respect to the throttle 3. The second throttle opening degree TA2 is preferably set to be a fully open state of the throttle 3 so as to reduce pumping loss by setting the intake negative pressure closer to the atmospheric pressure. The first throttle opening degree TA1 is a throttle opening degree that is necessary for the spark ignition combustion depending on the operating range of the HCCI engine 1.

As shown in FIG. 3(c), the fuel supplying amount F is set to be a first fuel supplying amount F1 at time point t0 at the time of the spark ignition combustion, and is set to be a second fuel supplying amount F2 at time point t4 at the time of the HCCI combustion. The first fuel supplying amount F1 is greater than the second fuel supplying amount F2. The second fuel supplying amount F2 is set to an amount necessary for the HCCI combustion depending on the operating range of the HCCI engine 1.

As shown in FIG. 3(e), the internal EGR amount Qegr is set to zero at time point t0 in the spark ignition combustion, and is set to the reference internal EGR amount Qegr 0 at time point t4 in the HCCI combustion. The reference internal EGR amount Qegr0 is an internal EGR amount necessary for the HCCI combustion depending on the operating range of the HCCI engine 1.

Solid lines in FIG. 4A represent the first intake lift amount IL1 and the first exhaust lift amount EL1. Dotted lines in FIG. 4A show the second intake lift amount IL2 and the second exhaust lift amount EL2. That is, the dotted lines represent comparative examples in FIGS. 4A to 5B.

As show in FIG. 3(a), the ECU 5 switches the maximum intake lift amount IL from the first intake lift amount IL1 to the second intake lift amount IL2 at time point t1. FIG. 4B shows a state immediately after the intake valve 11v is switched, or immediately after time point t1. In other words, FIG. 4B shows a state immediately after the maximum intake lift amount IL is switched from the first intake lift amount IL1 represented by the dotted line to the second intake lift amount IL2 represented by the solid line. The intake variable valve mechanism 11a switches the intake cam 11c from the intake low lift cam to the intake high lift cam so as to switch the maximum intake lift amount IL. Therefore, the maximum intake lift amount IL is decreased, and the valve duration of the intake valve is decreased. Decrease of the valve duration of the intake valve changes the intake valve open/close timing. In other words, the intake opening timing ITopn is delayed. The ECU 5 switches the maximum intake lift amount IL from the first intake lift amount IL1 to the second intake lift amount IL2, so that the intake opening timing ITopn is delayed relative to the exhaust top dead center TDC.

As show in FIG. 3(d), the ECU 5 switches the maximum exhaust lift amount EL from the first exhaust lift amount EL1 to the second exhaust lift amount EL2 at time point t3. That is, prior to switching from the first exhaust lift amount EL1 to the second exhaust lift amount EL2 at time point t3, the ECU 5 switches from the first intake lift amount IL1 to the second intake lift amount IL2 at time point t1.

In the present embodiment, the ECU 5 sets the intake opening timing ITopn to the reference intake opening timing ITopn0 at time point t1. That is, the intake opening timing ITopn immediately after the first intake lift amount IL1 is switched to the second intake lift amount IL2 is set to the reference intake opening timing ITopn0.

As shown in FIG. 4B, the ECU 5 delays the intake opening timing ITopn relative to the exhaust top dead center TDC when switching from the first intake lift amount IL1 to the second intake lift amount IL2. As a result, intake is started while the interior of the combustion chamber 10 is under negative pressure. This causes the intake air to spurt into the combustion chamber 10. Accordingly, the adiabatic compression effect of the combustion chamber 10 is enhanced, so that the temperature of the combustion chamber 10 is efficiently raised. The delay of the intake opening timing ITopn relative to the exhaust top dead center TDC is referred to as delayed opening of the intake valve 11v. The HCCI combustion is thus carried out in a reliable manner, and spark ignition by the ignition plug 60c is no longer necessary. The ECU 5 stops the spark ignition by the ignition plug 60c at the same time as switching from the first intake lift amount IL1 to the second intake lift amount IL2. That is, the ECU 5 switches the combustion mode from the spark ignition combustion to the HCCI combustion at the same time as switching the intake valve 11v.

The adiabatic compression effect due to the delay of the intake opening timing ITopn relative to the exhaust top dead center TDC enables the HCCI combustion. The ECU 5 thus starts generating the internal EGR amount Qegr in the HCCI combustion. As a result, the ECU 5 is prevented from starting to generate the internal EGR amount Qegr in a state where, for example, the HCCI combustion is difficult. That is, the ECU 5 is capable of prevent the occurrence of a state where the spark ignition combustion and the HCCI combustion are simultaneously carried out. Therefore, as shown by the solid line in FIG. 3(f), the torque T of the HCCI engine 1 is prevented from being abruptly changed.

The dotted line in FIG. 3(f) represents a torque curve of a first comparison example. The first comparison example refers to a case where switching from the first intake lift amount IL1 to the second intake lift amount IL2 and switching from the first exhaust lift amount EL1 to the second exhaust lift amount EL2 are performed simultaneously. That is, in the first comparison example, when switching from the spark ignition combustion to the HCCI combustion, the internal EGR amount starts being generated at the same time as switching from the first exhaust lift amount EL1 to the second exhaust lift amount EL2. That is, in the first comparison example, the internal EGR amount Qegr is generated at the first throttle opening degree TA1. In the first comparison example, the torque is abruptly changed since the intake air amount is small in relation to the internal EGR amount Qegr. That is, in the first comparison example, the torque T is temporarily and significantly reduced as shown by the dotted line in FIG. 3(f).

During the period from time point t2 to time point t4, the ECU 5 increases the throttle opening degree from the first throttle opening degree TA1 to the second throttle opening degree TA2 as shown in FIG. 3(b), and simultaneously reduces the fuel supplying amount F from the first fuel supplying amount F1 to the second fuel supplying amount F2 as shown in FIG. 3(c).

That is, the ECU 5 switches from the first intake lift amount IL1 to the second intake lift amount IL2 at time point t1, thereby switching the combustion mode from the spark ignition combustion to the HCCI combustion. Thereafter, at and after time point t2, the ECU 5 controls the throttle opening degree TA and the fuel supplying amount F. At time point t3, the ECU 5 switches from the first exhaust lift amount EL1 to the second exhaust lift amount EL2, so that the exhaust closing timing ETcls is delayed relative to the reference exhaust closing timing ETcls0. As a result, a negative overlap is established.

Figure 6:
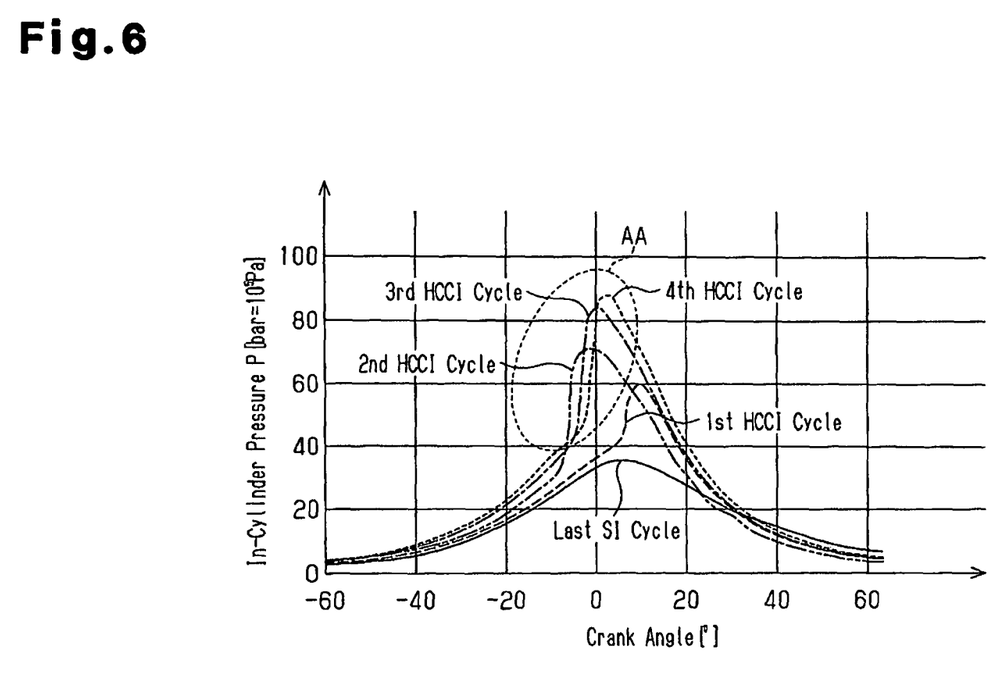
FIG. 6 is a graph showing the in-cylinder pressure P according to a second comparative example.

FIG. 6 shows a second comparative example. In the second comparative example, the first intake lift amount IL1 is switched to the second intake lift amount IL2 in the combustion cycle at time point t1. In the next combustion cycle, the exhaust closing timing ETcls is switched to the reference exhaust closing timing ETcls0. The vertical axis of FIG. 6 represents the in-cylinder pressure P, or the pressure in the combustion chamber, when such a negative overlap is established. The horizontal axis of FIG. 6 represents the crank angle. Zero degrees of the crank angle represents the exhaust top dead center TDC. In the second comparative example, premature ignition can occur.

FIG. 6 shows the in-cylinder pressure P in each of a final spark ignition combustion cycle, a first HCCI cycle, a second HCCI cycle, a third HCCI cycle, and a fourth HCCI cycle. The final spark ignition combustion cycle refers to the final combustion cycle of the spark ignition when the spark ignition combustion is switched to the HCCI combustion. The first HCCI cycle refers to a combustion cycle subsequent to the final spark ignition combustion cycle. That is, the first HCCI cycle refers to the first combustion cycle of the HCCI combustion after the first intake lift amount IL1 is switched to the second intake lift amount IL2. The second HCCI cycle refers to a combustion cycle subsequent to the first HCCI combustion cycle. In the second comparative example, the exhaust closing timing ETcls is switched to the reference exhaust closing timing ETcls0 during the second HCCI cycle. That is, the reference internal EGR amount Qegr0 is set during the second HCCI cycle.

As shown in FIG. 6, the in-cylinder pressure P in the vicinity of the exhaust top dead center TDC in the second comparative example continuously increases through the final spark ignition combustion cycle, the first HCCI cycle, the second HCCI cycle, the third HCCI cycle, and the fourth HCCI cycle. This is because, since the first to fourth HCCI cycles are executed with the throttle opening degree TA is maintained at the first throttle opening degree TA1, the amount of intake gas becomes insufficient. This lowers the torque. That is, in the second comparative example shown in FIG. 6, internal EGR gas, the temperature of which has been increased by the adiabatic compression effect due to the HCCI combustion, is generated in the combustion cycle immediately after the first intake lift amount IL1 is switched to the second intake lift amount IL2. Thus, as shown by area AA, which is defined by a dotted line in FIG. 6, the temperature in the combustion chamber 10 excessively increases in the vicinity of the exhaust top dead center TDC in the second to fourth HCCI cycles. This raises the probability of premature ignition and knocking.

To solve the problem shown in FIG. 6, the ECU 5 of the present embodiment switches from the first exhaust lift amount EL1 to the second exhaust lift amount EL2 after switching from the first intake lift amount IL1 to the second intake lift amount IL2, thereby delaying the exhaust closing timing ETcls relative to the reference exhaust closing timing ETcls0. As a result, the internal EGR amount Qegr is controlled in a reliable manner. Thus, according to the present embodiment, the temperature in the combustion chamber 10 is prevented from being excessively increased immediately after the first intake lift amount IL1 is switched to the second intake lift amount IL2. Further, the fuel supplying amount F is prevented from being insufficient.

During the period from time point t2 to time point t4, the ECU 5 increases the throttle opening degree from the first throttle opening degree TA1 to the second throttle opening degree TA2 as shown in FIG. 3(b), and simultaneously reduces the fuel supplying amount F from the first fuel supplying amount F1 to the second fuel supplying amount F2 as shown in FIG. 3(c). As a result, the fuel in the combustion chamber 10 gradually becomes lean. Therefore, while excessive temperature rise in the combustion chamber 10 is suppressed, the engine 1 is shifted to the steady operation of the HCCI combustion. The torque fluctuation in the period where the spark ignition combustion switched to the HCCI combustion is further suppressed.

As show in FIG. 3(d), the ECU 5 switches the maximum exhaust lift amount EL from the first exhaust lift amount EL1 to the second exhaust lift amount EL2 at time point t3. In the present embodiment, the ECU 5 switches from the first exhaust lift amount EL1 to the second exhaust lift amount EL2 as shown in FIG. 5A, so that the exhaust closing timing ETcls is delayed relative to the reference exhaust closing timing ETcls0. As a result, an internal EGR amount Qegr is generated in the combustion chamber 10. Thus, the internal EGR amount Qegr that is present in the combustion chamber 10 immediately after time point t3 is less than the reference internal EGR amount Qegr0. This suppresses an excessive increase of the temperature in the combustion chamber 10.

The alternate long and short dash line in FIG. 5A represents the reference exhaust closing timing ETcls0. The reference exhaust closing timing ETcls0 is advanced relative to the exhaust top dead center TDC. The exhaust closing timing ETcls, which corresponds to the second exhaust lift amount EL2, is advanced relative to the exhaust top dead center TDC. Therefore, "switching from the first exhaust lift amount EL1 to the second exhaust lift amount EL2 such that the exhaust closing timing ETcls is delayed relative to the reference exhaust closing timing ETcls0" refers to switching from the first exhaust lift amount EL1 to the second exhaust lift amount EL2 such that the exhaust closing timing ETcls is between the reference exhaust closing timing ETcls0 and the exhaust top dead center TDC.

During the period from time point t3 to time point t4, the ECU 5 advances the exhaust closing timing ETcls to the reference exhaust closing timing ETcls0 as shown by an arrow in FIG. 5A. That is, the exhaust closing timing ETcls is moved away from the exhaust top dead center TDC, and brought closer to the reference exhaust closing timing ETcls0. Therefore, as shown in FIG. 3(e), the internal EGR amount Qegr is significantly increased in the period from time point t3 to time point t4.

In tandem with advancing the exhaust closing timing ETcls, the ECU 5 increases the throttle opening degree TA as shown in FIG. 3(b) and reduces the fuel supplying amount F. FIG. 5B shows the reference exhaust closing timing ETcls0. The internal EGR amount Qegr is gradually increased to the reference internal EGR amount Qegr0. Thus, while suppressing torque fluctuation, the combustion mode can be switched from the spark ignition combustion to the HCCI combustion.

Figure 7:
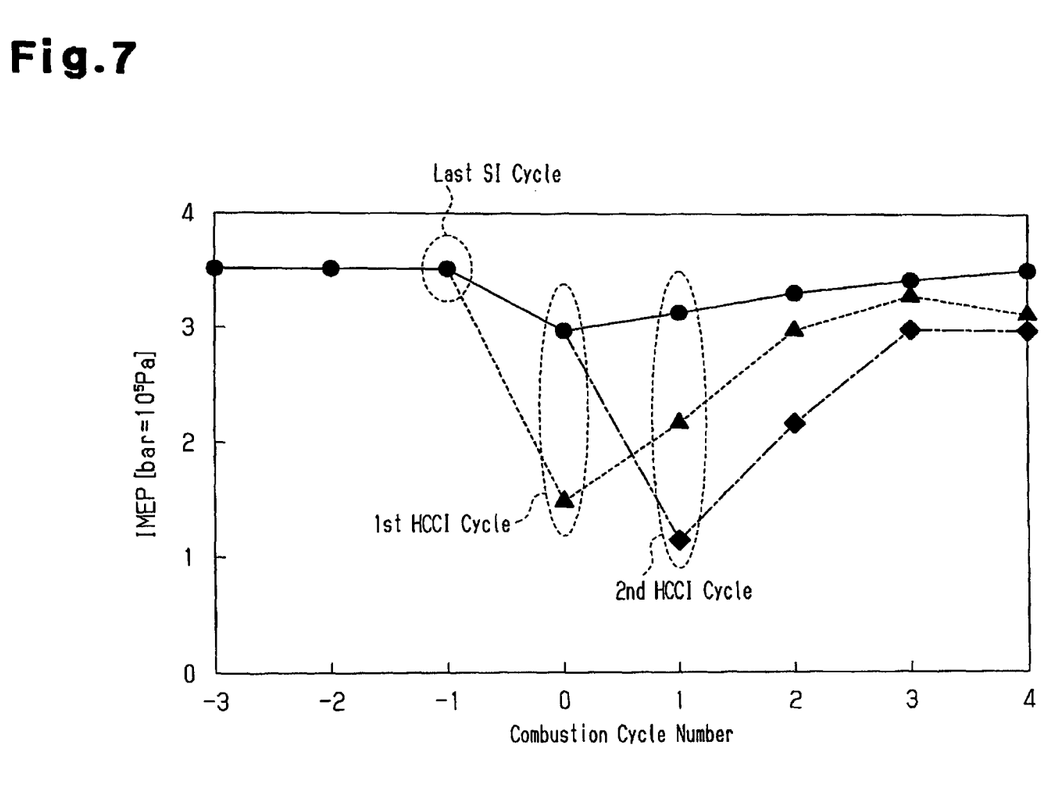
FIG. 7 is a graph showing the IMEP (indicated mean effective pressure) of the example (solid line, filled circles), the first comparative example (dotted line, triangles), and the second comparative example (alternate long and short dash line, filled diamonds).

FIG. 7 is a graph showing the IMEP (indicated mean effective pressure) of the experiment results of the example, the first comparative example, and the second comparative example. The IMEP (indicated mean effective pressure) is a value obtained by averaging the ever-changing gas pressure on the assumption that, in the expansion stroke of the HCCI engine 1, a constant gas pressure is generated during the period where the piston 20 moves from the exhaust top dead center TDC to the bottom dead center. The horizontal axis in FIG. 7 represents the number of combustion cycles. In FIG. 7, the first HCCI cycle is set as the zeroth combustion cycle.

In FIG. 7, the solid line formed by connecting the filled circles (●) represents the example. The dotted line formed by connecting filled triangles (▲) represents the first comparison example. The alternate long and short dash line formed by connecting filled diamonds (♦) represents the second comparison example. The first comparison example refers to a case where, in the first HCCI cycle, switching from the first intake lift amount IL1 to the second intake lift amount IL2 and switching from the first exhaust lift amount EL1 to the second exhaust lift amount EL2 are performed simultaneously. The second comparative example refers to a case where, in the first HCCI cycle, the first intake lift amount IL1 is switched to the second intake lift amount IL2, and in the second HCCI cycle, the first exhaust lift amount EL1 is switched to the second exhaust lift amount EL2 so that the exhaust closing timing ETcls becomes the reference exhaust closing timing ETcls0.

As shown in FIG. 7, the IMEP of the example is flat. However, the IMEP of the first comparison example drops significantly in the first HCCI cycle. The IMEP of the second comparison example drops significantly in the second HCCI cycle. Therefore, compared to the first and second comparative examples, the present embodiment evidently suppresses abrupt changes of the torque.

The present embodiment has the following advantages.

(1) Prior to switching from the first exhaust lift amount EL1 to the second exhaust lift amount EL2, the ECU 5 switches the first intake lift amount IL1 to the second intake lift amount IL2 at time point t1, so that the intake opening timing ITopn is delayed relative to the exhaust top dead center TDC. Therefore, when the combustion mode is switched from the spark ignition combustion to the HCCI combustion, the intake stroke of the HCCI engine 1 is started with the in-cylinder pressure P being a negative pressure. This causes the intake air to spurt into the combustion chamber 10. Accordingly, the adiabatic compression effect of the combustion chamber 10 allows the temperature of the combustion chamber 10 to be efficiently raised. As a result, the HCCI combustion is performed in a reliable manner.

Further, at time point t3, the ECU 5 switches the first exhaust lift amount EL1 to the second exhaust lift amount EL2, so that the exhaust closing timing ETcls is delayed relative to the reference exhaust closing timing ETcls0. Therefore, immediately after the first exhaust lift amount EL1 is switched to the second exhaust lift amount EL2, the internal EGR amount Qegr in the combustion chamber 10 is less than the reference internal EGR amount Qegr0. It is possible to prevent the occurrence of a state where the spark ignition combustion and the HCCI combustion are simultaneously carried out. Abnormal combustion such as premature ignition can be therefore prevented, and abrupt changes of the torque are suppressed. The present invention does not require the stratified charge combustion between the spark ignition combustion and the HCCI combustion. This eliminates the necessity of complicated and costly mechanisms such as an in-cylinder injection system. The advantages of the HCCI combustion, namely the improved fuel economy and the reduction of emission, are maximized.

(2) During the period from time point t1 to time point t3, the ECU 5 controls the throttle opening degree TA and the fuel supplying amount F. That is, the ECU 5 controls the throttle opening degree TA and the fuel supplying amount F during the period from when switching from the first intake lift amount IL1 to the second intake lift amount IL2 at time point t1 to when switching from the first exhaust lift amount EL1 to the second exhaust lift amount EL2 at time point t3.

Therefore, during the period from time point t1 to time point t3, the intake air amount into the combustion chamber 10 is controlled by controlling the throttle opening degree TA. Also, the combustion state of the HCCI engine 1 is controlled by controlling the fuel supplying amount F. It is thus possible to shift the spark ignition combustion to the HCCI combustion, while preventing premature ignition and unexpected quenching. As a result, torque fluctuation in a switching period is further suppressed.

(3) During the period from time point t1 to time point t3, the ECU 5 reduces the fuel supplying amount F, while increasing the throttle opening degree TA. Premature ignition and unexpected quenching are reliably prevented, and torque fluctuation is further suppressed.

(4) After switching from the first exhaust lift amount EL1 to the second exhaust lift amount EL2 at time point t3, the ECU 5 advances the exhaust closing timing ETcls to the reference exhaust closing timing ETcls0. It is thus possible to gradually increase the internal EGR amount Qegr. Thus, while further suppressing torque fluctuation, the combustion mode can be switched from the spark ignition combustion to the HCCI combustion.

(5) The intake variable valve mechanism 11a switches the intake cam 11c from the intake high lift cam to the intake low lift cam. The exhaust variable valve mechanism 12a switches the exhaust cam 12c from the exhaust high lift cam to the exhaust low lift cam. Therefore, unlike complicated variable valve actuation mechanisms such as electromagnetic driving types, the intake variable valve mechanism 11a and the exhaust variable valve mechanism 12a each have a simple construction.

The preferred embodiment may be modified as follows.

As shown by the alternate long and short dash line in FIG. 4B, the intake opening timing ITopn may be advanced relative to the reference intake opening timing ITopn0 immediately after switching from the first intake lift amount IL1 to the second intake lift amount IL2 at time point t1. That is, during the period from time point t1 to time point t3, the ECU 5 may advance the intake opening timing ITopn relative to the reference intake opening timing ITopn0 at the same time as controlling the throttle opening degree TA and the fuel supplying amount F. In this case, since the intake opening timing ITopn is delayed relative to the exhaust top dead center TDC, "advancing the intake opening timing ITopn relative to the reference intake opening timing ITopn0" refers to shifting of the intake opening timing ITopn from the reference intake opening timing ITopn0 toward the exhaust top dead center TDC.

The ECU 5 determines whether to advance the intake opening timing ITopn based on the operating state of the HCCI engine 1 in the spark ignition combustion. That is, if the combustion in the HCCI engine 1 is predicted to become intense at the second intake lift amount IL2, the intake opening timing ITopn is advanced. As a result, in the intake stroke of the HCCI engine 1, the flow rate of intake air flowing from the intake passage 11p into the combustion chamber 10 is reduced. The adiabatic compression effect of the combustion chamber 10 is suppressed, so that the temperature in the combustion chamber 10 is not excessively increased. As a result, premature ignition is easily prevented. During the period from time point t3 to time point t4, the ECU 5 delays the intake opening timing ITopn to the reference intake opening timing ITopn0 at the same time as advancing the exhaust closing timing ETcls to the reference exhaust closing timing ETcls0.

The intake valve characteristics such as the valve lift amount and the valve open/close timing of the intake valve 11v may be switched by an electromagnetic driving mechanism. Similarly, the exhaust valve characteristics such as the valve lift amount and the valve open/close timing of the exhaust valve 12v may be switched by an electromagnetic driving mechanism.

The second throttle opening degree TA2 may be smaller than the fully open state of the throttle 3.

The intake variable valve mechanism 11a may have a mechanism for changing the maximum intake lift amount IL and a mechanism for changing the valve open/close timing separately. Similarly, the exhaust variable valve mechanism 12a may have a mechanism for changing the maximum exhaust lift amount EL and a mechanism for changing the valve open/close timing separately.

When the spark ignition combustion is switched to the HCCI combustion, the ignition plug 60c may execute spark ignition accessorily, so as to stabilize the combustion of the HCCI engine 1. The ECU 5 is capable of controlling the spark ignition irrespective of the operation of the intake variable valve mechanism 11a and the exhaust variable valve mechanism 12a.

The invention claimed is:

1. A homogeneous charge compression ignition (HCCI) engine, wherein the HCCI engine allows a combustion mode to be switched between an HCCI combustion and a spark ignition combustion, the HCCI engine comprising:
a combustion chamber;
a piston that reciprocates in the combustion chamber, the piston defining an exhaust top dead center of the combustion chamber;
an intake valve;
an exhaust valve;
an intake variable valve mechanism for changing an intake lift amount, which is a lift amount of the intake valve, wherein the intake lift amount is set to a first intake lift amount in the spark ignition combustion and to a second intake lift amount in the HCCI combustion, wherein the intake variable valve mechanism is capable of controlling an intake opening timing, which is the opening timing of the intake valve;
an exhaust variable valve mechanism for changing an exhaust lift amount, which is a lift amount of the exhaust valve, wherein the exhaust lift amount is set to a first exhaust lift amount in the spark ignition combustion and to a second exhaust lift amount in the HCCI combustion, wherein the exhaust variable valve mechanism is capable of controlling an exhaust closing timing, which is the closing timing of the exhaust valve, and wherein a reference exhaust closing timing to be used in the HCCI combustion is set;
a controller for controlling the intake variable valve mechanism and the exhaust variable valve mechanism,
wherein the controller sets an internal EGR amount, which includes the amount of burned gas that remains in the combustion chamber at the time of the HCCI combustion, by setting a negative valve overlap period, during which both of the intake valve and the exhaust valve are closed, such that not all the burned gas is discharged from the combustion chamber,
wherein, when switching the combustion mode from the spark ignition combustion to the HCCI combustion, the controller executes following operations:
a) switching the intake lift amount from the first intake lift amount to the second intake lift amount, such that the intake opening timing is delayed relative to the exhaust top dead center, so that intake is started while the interior of the combustion chamber is under negative pressure during an intake stroke, causing the intake air to spurt into the combustion chamber and an adiabatic compression effect of the combustion chamber is enhanced, so that the temperature of the combustion chamber is raised and the HCCI combustion is thus carried out;
b) switching the exhaust lift amount from the first exhaust lift amount to the second exhaust lift amount; and
c) temporarily delaying the exhaust closing timing relative to the reference exhaust closing timing corresponding to the HCCI engine load and speed in the HCCI combustion, such that the internal EGR amount is generated less than the internal EGR amount generated by the reference exhaust closing timing after the operation a) to suppress an excessive increase of the temperature in the combustion chamber to prevent the occurrence of a state where the spark ignition combustion and the HCCI combustion are simultaneously carried out and abrupt changes of the torque are suppressed, and then advancing the exhaust closing timing to the reference exhaust closing timing.

2. The HCCI engine according to claim 1, further comprising a throttle, wherein the opening degree of the throttle is controlled so as to control the intake air amount to the combustion chamber,
wherein the controller is capable of controlling a fuel supplying amount, which is the amount of fuel supplied to the combustion chamber, and
wherein the controller controls the throttle opening degree and the fuel supplying amount in a period after when the first intake lift amount is switched to the second intake lift amount and before when the first exhaust lift amount is switched to the second exhaust lift amount.

3. The HCCI engine according to claim 2, further comprising an intake passage communicating with the combustion chamber, the fuel supplying amount is supplied to the intake passage,
wherein the controller reduces the fuel supplying amount while increasing the throttle opening degree, thereby setting the fuel supplying amount to an amount necessary for the HCCI combustion.

4. The HCCI engine according to claim 2, wherein the controller advances the intake opening timing at the same time as controlling the throttle opening degree and the fuel supplying amount.

5. The HCCI engine according to claim 1, wherein the intake variable valve mechanism has an intake low lift cam and an intake high lift cam that actuate the intake valve,
wherein the exhaust variable valve mechanism has an exhaust low lift cam and an exhaust high lift cam that actuate the exhaust valve,
wherein the intake variable valve mechanism switches the intake lift amount by switching the intake low lift cam to the intake high lift cam, and
wherein the exhaust variable valve mechanism switches the exhaust lift amount by switching the exhaust low lift cam to the exhaust high lift cam.

6. A method for controlling a homogeneous charge compression ignition (HCCI) engine, wherein the HCCI engine allows a combustion mode to be switched between an HCCI combustion and a spark ignition combustion, the HCCI engine including:
a combustion chamber;
a piston that reciprocates in the combustion chamber, the piston defining an exhaust top dead center of the combustion chamber;
an intake valve;
an exhaust valve;
an intake variable valve mechanism for changing an intake lift amount, which is a lift amount of the intake valve, wherein the intake lift amount is set to a first intake lift amount in the spark ignition combustion and to a second intake lift amount in the HCCI combustion, wherein the intake variable valve mechanism is capable of controlling an intake opening timing, which is the opening timing of the intake valve; and an exhaust variable valve mechanism for changing an exhaust lift amount, which is a lift amount of the exhaust valve, wherein the exhaust lift amount is set to a first exhaust lift amount in the spark ignition combustion and to a second exhaust lift amount in the HCCI combustion, wherein the exhaust variable valve mechanism is capable of controlling an exhaust closing timing, which is the closing timing of the exhaust valve, and wherein a reference exhaust closing timing to be used in the HCCI combustion is set, the method comprising:

generating an internal EGR amount, which includes the amount of burned gas that remains in the combustion chamber at the time of the HCCI combustion, by setting a negative valve overlap period, during which both of the intake valve and the exhaust valve are closed, such that not all the burned gas is discharged from the combustion chamber, executes following operations when switching the combustion mode from the spark ignition combustion to the HCCI combustion:

a) switching the intake lift amount from the first intake lift amount to the second intake lift amount, such that the intake opening timing is delayed relative to the exhaust top dead center, so that intake is started while the interior of the combustion chamber is under negative pressure during an intake stroke, causing the intake air to spurt into the combustion chamber and an adiabatic compression effect of the combustion chamber is enhanced, so that the temperature of the combustion chamber is raised and the HCCI combustion is thus carried out;

b) switching the exhaust lift amount from the first exhaust lift amount to the second exhaust lift; and c) temporarily delaying the exhaust closing timing relative to the reference exhaust closing timing corresponding to the HCCI engine load and speed in the HCCI combustion, such that the internal EGR amount is generated less than the internal EGR amount generated by the reference exhaust closing timing after the operation a) to suppress an excessive increase of the temperature in the combustion chamber to prevent the occurrence of a state where the spark ignition combustion and the HCCI combustion are simultaneously carried out and abrupt changes of the torque are suppressed, and then advancing the exhaust closing timing to the reference exhaust closing timing.

7. The HCCI engine according to claim 1, wherein when the combustion mode is switched from the spark ignition combustion to the HCCI combustion, the controller is configured to switch the exhaust lift amount from the first exhaust lift amount to the second exhaust lift amount after one HCCI combustion cycle subsequent to a combustion cycle in which the intake lift amount is switched from the first intake lift amount to the second intake lift amount has passed.

* * * * *